United States Patent [19]

Ruben

[11] 3,870,563

[45] Mar. 11, 1975

[54] HERMETICALLY SEALED STORAGE BATTERY

[76] Inventor: Samuel Ruben, 53 Seacord Rd., New Rochelle, N.Y. 10801

[22] Filed: July 16, 1973

[21] Appl. No.: 379,443

Related U.S. Application Data

[63] Continuation-in-part of Ser. Nos. 82,701, Oct. 21, 1970, abandoned, and Ser. No. 252,724, May 12, 1972, Pat. No. 3,798,070, and Ser. No. 277,787, Aug. 3, 1972, abandoned, and Ser. No. 293,367, Sept. 29, 1972, abandoned.

[52] U.S. Cl. ................................ 136/26, 136/64
[51] Int. Cl. .................................. H01m 39/00
[58] Field of Search ............................ 136/26–27, 136/19, 40, 64, 65, 154, 157, 6 R

[56] References Cited
UNITED STATES PATENTS

| | | | |
|---|---|---|---|
| 2,649,766 | 8/1953 | Johnson | 136/154 |
| 3,271,199 | 9/1966 | Beste et al. | 136/157 |
| 3,447,969 | 6/1969 | Tudor et al. | 136/26 |
| 3,455,738 | 7/1969 | Ruben | 136/24 X |
| 3,532,544 | 10/1970 | Nozaki et al. | 136/27 |
| 3,615,831 | 10/1971 | Ruben | 136/26 |

*Primary Examiner*—Anthony Skapars

[57] ABSTRACT

The invention comprises a storage battery having a positive electrode of lead peroxide supported by a grid of titanium having a polarization inhibiting layer between the titanium and the lead peroxide, a negative electrode of lead supported by a grid of stainless steel and an electrolyte of sulfuric acid, preferably gelled, containing a small amount of titanyl sulfate. The battery is hermetically sealed.

10 Claims, 6 Drawing Figures

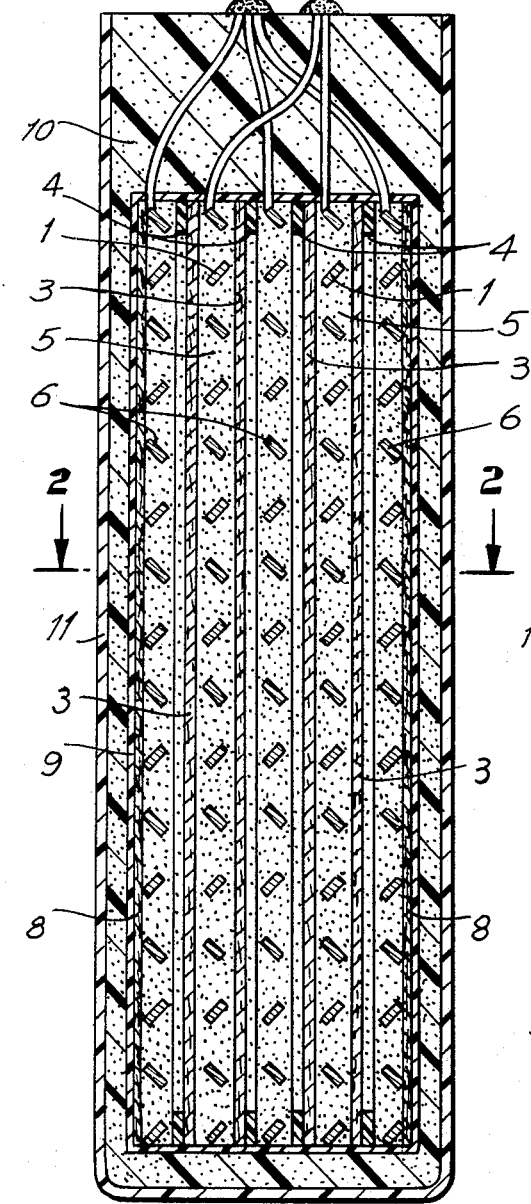
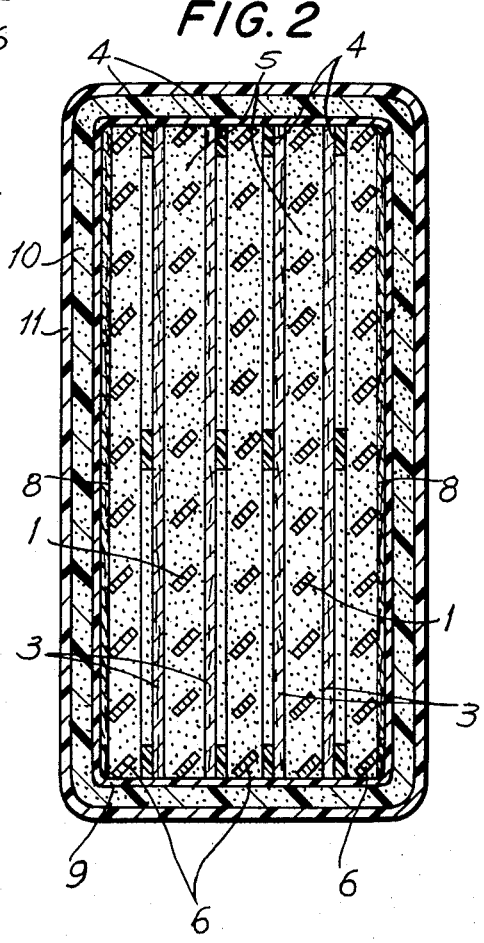

HERMETICALLY SEALED STORAGE BATTERY

The present application is a continuation in part of my co-pending applications Ser. No. 82,701 filed Oct. 21, 1970, now abandoned, entitled "Hermetically Sealed Lead Acid Storage Battery" Ser. No. 252,724 filed May 12, 1972, now U.S. Pat. No. 3,798,070, entitled "Lead-Acid Storage Battery with Titanyl Sulfate Buffered Electrolyte"; Ser. No. 277,787 filed Aug. 3, 1972, now abandoned, entitled "Maintenance-Free Sealed Storage Battery" and Ser. No. 293,367 filed Sept. 29, 1972, now abandoned, entitled "Electrode for Lead Acid Storage Battery."

This invention relates to a storage battery utilizing the reversible charging characteristics of a lead peroxide positive electrode and a porous lead negative electrode in contact with an electrolyte of sulfuric acid. The lead peroxide reactant is supported on a thin grid of titanium, preferably expanded and stretched and the porous lead reactant is supported on a thin grid of stainless steel, likewise preferably expanded and stretched. The stainless steel is of the chromium-nickel-iron type, such as No. 304, having a nominal composition of 18% chromium, 8% nickel, 2% manganese and the balance iron. To avoid polarizing effects, both positive and negative grids are preliminarily plated with a thin layer of nickel and then lead plated. The electrolyte is gelled by the addition of sub-micron silica.

I have found that chemical attack on shelf by the sulfuric acid electrolyte on both the titanium and the stainless steel grids may be reduced to a negligible amount by adding about 1% of titanyl sulfate (TiOSO$_4$) to the sulfuric acid. The titanyl sulfate acts as inhibitor for both the stainless steel and the titanium, making both of them passive to the sulfuric acid electrolyte when on shelf. The titanyl sulfate may be the commerical basic sulfate dissolved into the sulfuric acid by heating the solution to a temperature of about 90° C.

While stainless steel having a heavy lead plate is useful to a limited extent as a supporting grid for the positive electrode, I have found that after a number of cycles, it is anodically attacked with resultant cell failure.

The use of titanium as the supporting grid for lead peroxide requires an integral non-polarizing layer between the grid and the oxide that will prevent a potential gradient from being established between the titanium and the electrolyte. While in my earlier patent applications, I cited the use of a gold film to prevent polarization, I have now found that I may dispense with the use of gold, by first plating the titanium with a thin adherent coating of nickel, followed by an integral lead deposite of low porosity derived from a fluoborate solution.

I have discovered that by dissolving a small amount of titanyl sulfate in sulfuric acid, stainless steel, particularly the types composed essentially of iron, chromium, and nickel, such as the No. 300 series, may be exposed to or immersed in the solution without being attacked. The addition of the titanyl sulfate appears to completely passivate the stainless steel and thus permits the use of a thin light weight reactant support affording excellent current distribution with minimal ionic polarization.

In conventional lead acid storage batteries as presently used, a large proportion of the weight results from the use of the heavy massive lead electrodes and grids. The use of titanium as the positive electrode base and stainless steel as the negative electrode base, permits a very substantial reduction in weight (density of Ti = 4.3 grams/cm$^3$ and density of No. 304 stainless steel approximately 4.9 grams/cm$^3$ at 20°C as compared to Pb at 11.342 grams/cm$^3$ at 20°C). Expansion and stretching of the comparatively thin titanium and stainless steel grid materials to a degree not practically feasible with lead, provide maximum areas of exposure of the retained oxide to the electrolyte with improved mass utilization. The amount of the active mass efficiency cited in the literature for lead acid batteries is between 35 and 50 percent. This is accounted for by the restrictions imposed on the lead grid structure. In my battery, as described herein, the path length between the PbO$_2$ and the electronic conductor is small, which allows a mass efficiency of 83 to 90 percent at 12 hour rate. Titanium and stainless steel being of high tensile strength, large size electrodes may be utilized, beyond the practical limits of lead. The use of these grids allows uniform distribution of current and contact with the reactants during the reversible reaction of

$$PbO_2 + Pb + H_2SO_4 \rightleftharpoons PbSO_4 + H_2O$$

An important aspect of this invention is that the nature of the battery elements permits a hermetically sealed construction. The active cell structure is sealed in an epoxy resin, producing a truly maintenance-free structure. The assembly of the cell constituents, in combination with the gel electrolyte, allows internal reconversion of any extraneous gases in the restricted and sealed-off area of the electrodes.

To obtain a strong, solid epoxy seal, it is necessary, before encapsulation to completely and tightly wrap the assembled cell in resin-impermeable acid resistant plastic film. This plastic film seal serves a dual purpose — it prevents the egress of any immobilized acid gel into the resin which the resin is in a liquid state (contact of the resin with the electrolyte would prevent hardening of the resin); it prevents ingress of the resin into the gel electrolyte, reaction with, would affect the proper electrochemical operation of the cell.

The use of the expanded titanium and stainless steel grids, permits the construction of batteries in a variety of shapes and makes possible the utilization of plates much larger than feasible with conventional lead structures. Two types of cells of this invention are illustrated in the drawings, FIG. 1 showing a rectangular structure and FIG. 5 showing a cylindrical structure.

The invention will be better understood after reading the following detailed description thereof with reference to the appended drawings in which, FIG. 1 is a vertical sectional view through a battery embodying the invention;

FIG. 2 is a transverse sectional view taken along the line 2—2 in FIG. 1;

Figure 3:
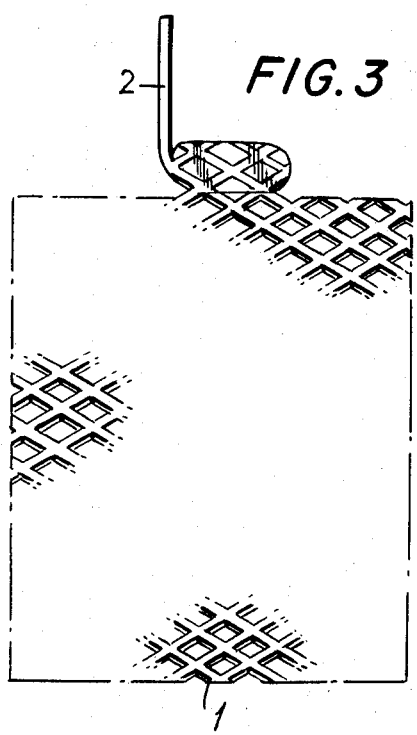
FIG. 3 is a view of the positive electrode grid.

The following description of the materials, processing and assembly of the parts in these two embodiments will be useful in describing the invention in some detail. The terms "positive" and "negative" electrodes as used herein, refer to the output polarities.

Regerring to FIG. 1, the positive electrodes 1 having an integral tab section and external lead 2 utilize a grid of 0.010 inch thick pure titanium, expanded and stretched to a diamond-shaped pattern of 0.060 inch overall thickness. After degreasing, chemical cleaning for 70 seconds in an ammonium fluoride-ammonium bifluoride solution, and water rinsing, a very thin nickel plating from a $NiSO_4/NiCl_2$/boric acid solution is applied to the grid which is then rinsed and dried. For a grid 3 2/16 × 4 5/16 inches having an integral tab section 1 ⅛ × 2 inches, the plating may be applied in 1 minute at a current of 5 amperes with a deposition of 0.091 grams. The nickel plated grid of the above dimensions is then lead plated at a current of 4 amperes for 1 hour in a lead fluoborate solution so that approximately 15.4 grams of lead is deposited, intimately bonded to the nickel surface. The lead plated grid is then coated with approximately 70 grams (weight after drying) of paste made by grinding 60.0 grams of red lead, 8.4 cc. 6% by volume $H_3PO_4$, (7.1 cc 85% $H_3PO_4$/92.9 cc. $H_2O$) and 2.8 cc of a solution consisting of 5 parts by volume of 1.400 s.g. $H_2SO_4$ and 1 part by volume of 1.311 s.g. titanyl sulfated $H_2SO_4$. The coated plates are air dried for 24 hours, then immersed for 10 minutes in a solution consisting of 5 parts by volume 1.400 s.g. $H_2SO_4$ and 1 part by volume 1.311 s.g. titanyl sulfated $H_2SO_4$. Following dipping, the electrode is air dried for 48 hours.

The negative electrode 6 of the same dimensions as the positive grid, having an integral tab section and external lead 7 utilizes stainless steel No. 304 fully annealed, 0.008 inch thick, expanded and stretched to a diamond-shaped pattern of 0.045 inch overall thickness. After degreasing, cleaning in HCl solution and cold water rinsing, a flash nickel plating (5 amps for 30 seconds in $NiCl_2$/HCl solution) is applied to the grid, which is then rinsed and dried the weight of the deposited nickel being 0.0152 grams. Thereafter a lead plating is applied over the nickel in the same manner as described for the positive grid. The lead plated grid is then coated with the same materials and in the same manner as the positive grid, except that the thinner negative grid holds less mix — approximately 60 grams.

The initial nickel plate appears to be essential for both the titanium and stainless steel in maintaining a bonded coating. While nickel is the preferred plate, cobalt may also be used. Lead plating over the thin nickel plate has proved to be a practical method for maintaining satisfactory operation over many cycles.

The coated grids as described above, are then electroformed in 1.070 s.g. $H_2SO_4$ + 1.0% by volume 85% of $H_3PO_4$ to their respective reactants, $PbO_2$ on the positive electrode and porous Pb on the negative electrode.

Figure 4:
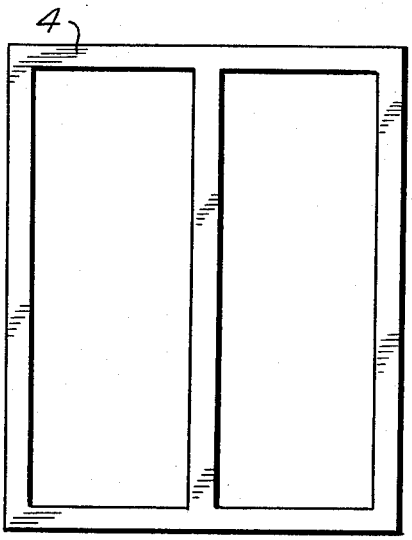
FIG. 4 is a view of the frame spacer employed in the battery of FIG. 1.

Thin sheets 3 of unwoven glass cloth coated with gel electrolyte 5 are placed in contact with the positive electrodes and 0.060 inch thick polyethylene frame 4, illustrated in FIG. 4. The frame has a ⅛ inch wide border and a ⅛ inch centerstrip. The gelled electrolyte is a non-separating self-supporting gel made by mixing sub-micron size silica with sulfuric acid containing a saturating amount of titanyl sulfate. It is confined within the open areas of the frame, the walls of which prevent squeezing out or loss of electrolyte when the assembly is compressed and encapsulated. The electrolyte permeates the glass spacers and is in intimate adhering contact with the negative electrode. The gelled acid, confined by the polyethylene frame spacers, provides a relatively immobile electrolyte which reduces local chemical action by eliminating free circulation of the electrolyte with dissolved by-products. As will be seen, the cell assembly comprises two positive electrodes and three negative electrodes separated by the gel filled unwoven glass cloth spacers and electrolyte filled frames. Sheets of untreated glass cloth 8, adjacent to the two outer negative electrodes, serve as compressible and absorbent end members. The assembly is tightly wrapped and enclosed in vinylidene chloride (Saran) film, 9 the wrapping being taped with "Scotch" brand tape to close any open areas and complete the sealing of the cell. Plastic container 11 is filled up to ¼ inch from the top with epoxy resin 10, the resin being poured at a temperature of 60°C. The cell unit is slowly dipped into the container so that the resin fills all spaces. After the encapsulating resin has hardened, the remaining space at the top of the container is filled with epoxy resin to which 10 percent by weight of finely divided silica has been added to form a hard white top seal.

During epoxy encapsulation and due to the exothermic reaction of the epoxy resin as it hardens, the elevated temperature of the immersed unit will cause displacement and discharge of air and occluded gases until the resin hardens and seals. The container must be of adequate thickness and strength not to distort under the conditions of expansion and contraction accompanying these temperature changes, as well as during the period of initial gas generation during the first cycle of charge. In operation, no progressive change in battery dimension occurs.

A container made from stainless steel, tern plate or other suitable metal may be used instead of a plastic case to house the cell and encapsulating medium. Metal cans are prepared by first degreasing internally and then applying an internal coating of epoxy so that all surfaces are completely covered. By permitting the excess epoxy to drain to the bottom of the can as curing takes place, a good bottom seal is assured.

FIG. 3 depicts in some detail the structure of terminal 2. The expanded titanium grid has an integral portion serving as the external lead.

The use of a metal other than titanium as the negative electrode is basically necessary. Titanium as a negative electrode reacts with hydrogen and dissolves, losing its mechanical strength and solid metal structure to some extent in the initial formation process, and even more so after a few cycles. This occurs in time regardless of whether the titanium is initially lead plated. Previously I have utilized lead plated expanded copper grids as the negative electrodes, and these were an improvement over titanium; however, on extended storage, some copper was dissolved into the electrolyte and redeposited as an oxide on the lead peroxide positive electrode with consequent reduction of cell voltage and storageability. In endeavoring to use stainless steel as a negative grid material, I found attack of the stainless steel, with nickel, iron, and chrome sulfate appearing in the gel electrolyte. I discovered that adding titanyl sulfate TiO.$SO_4$) to the 1.3000 S.G. sulfuric acid electrolyte (raising it to 1.311 S.G.) made the stainless steel of the No. 304 type so passive that only negligible traces could be determined in the electrolyte after a long period of time. The combination of chrome, iron, and nickel in the No. 300 series stainless steel has a definite passive reaction with a titanylated sulfuric acid electrolyte.

Under the confined condition of a relatively close spacing and complete encapsulating seal of the cells, it has been found that the cell potential does not rise very much on overcharge, indicating that any hydrogen or oxygen that may have been generated is combined, thus preventing the polarization voltage characteristics common to standard lead/acid batteries.

Figure 5:
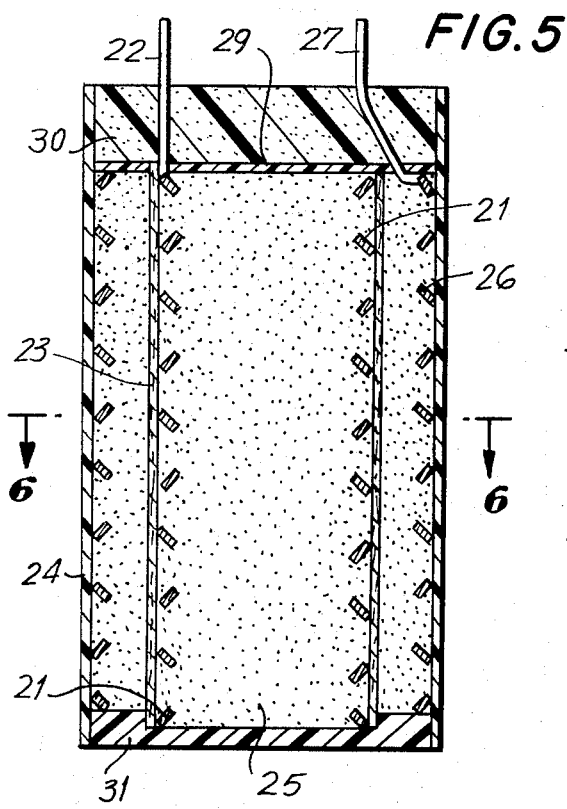
FIG. 5 is a vertical view, partly in section, of a cylindrical cell embodying the invention.
Figure 6:
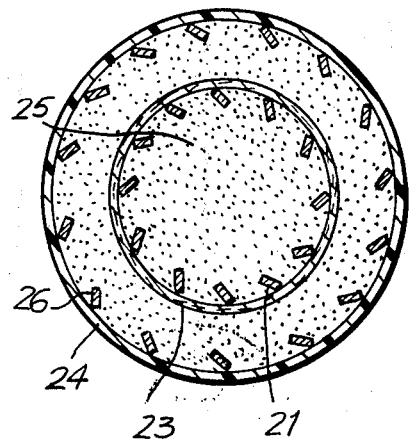
FIG. 6 is a transverse sectional view taken along the line of 6—6 in FIG. 5.

FIG. 5 illustrates the adaptability of the cell elements to cylindrical forms, the structure shown having overall dimensions similar to a "D" size primary dry cell. Plastic container 24 houses positive and negative cylindrical electrodes, 23 and 26 respectively, formed from the same materials utilized in the cell described in FIG. 1. The inner cylinder 23 having spot welded lead 22 is formed from expanded 0.060 thick titanium and the outer cylinder 26 having spot welded tab 27 is formed from 0.060 thick No. 304 stainless steel. The cylinders are nickel plated, then lead plated and thereafter coated and the spaces filled with lead oxide and processed in the same manner as the cell of FIG. 1. To increase the capacity, the cylinders may be corrugated before plating. After electroforming, the cylinders are placed in the plastic container and the space between the two cylinders and the space inside the inner cylinder is filled with the gel titanylated sulfuric acid electrolyte 25. A form fitting polyethylene disc 29 which serves the same purpose as the Saran wrapping in FIG. 1 and having two slots for the leads is forced into the container and rests upon the tops of the cylinders. Any space between the slots and the leads is filled with quick acting epoxy. The space between the sealing disc 29 and the top is also filled with epoxy resin 30.

What I claim is:

1. An electric storage battery having a positive electrode comprising a grid of titanium, a thin layer of nickel on the titanium, a dense layer of lead over the nickel and a coating of lead peroxide on said lead; a negative electrode comprising a grid of stainless steel, a thin layer of nickel on the stainless steel, a dense plating of lead on the nickel, a porous spongy coating of lead on said plated lead, and an electrolyte of sulfuric acid.

2. A hermetically sealed rechargeable cell comprising a container housing a positive electrode having a base of nickel plated titanium, a plating of lead over the nickel surface and a coating of lead peroxide over said lead; a negative electrode having a base of stainless steel of the type consisting preponderantly of iron and the balance substantially all chromium and nickel; a thick nickel plate over the stainless steel and a coating of porous spongy lead over said nickel surface; a spacer between said electrodes filled with an electrolyte of gelled sulfuric acid containing in the order of 1% titanyl sulfate dissolved therein, a resin impermeable and electrolyte inert plastic film tightly wrapped around said electrodes and spacers and sealing the same, said sealed unit being hermetically sealed by encapsulation in an epoxy resin serving to maintain the cell elements in pressure contact, said plastic film preventing contact of the epoxy resin with the electrolyte and reaction therewith.

3. An electric storage battery having a positive electrode comprising a grid of titanium; a first thin layer of one of the metals nickel and cobalt on said titanium; a second layer of dense plated lead over said first layer; and a coating of lead peroxide electro-formed from a lead oxide mixture bonded to said second layer; a negative electrode comprising a grid of stainless steel having a thin layer of one of the metals nickel and cobalt and a dense plating of lead thereover; a porous spongy coating of lead on said dense plated lead; and an electrolyte consisting preponderently of sulfuric acid having a small amount of titanyl sulfate dissolved therein.

4. An electric storage battery according to claim 1 in which the sulfuric acid electrolyte contains a small amount of titanyl sulfate dissolved therein to inhibit attack on the titanium grid by said electrolyte.

5. An electric storage battery according to claim 1 in which the sulfuric acid electrolyte contains a small amount of titanyl sulfate dissolved therein to inhibit attack on the stainless steel grid by said electrolyte.

6. An electric storage battery according to claim 1 wherein the electrolyte is in the form of a gel and substantially immobilized.

7. An electric storage battery according to claim 1 wherein the positive electrode grid is composed of expanded titanium metal.

8. An electric storage battery according to claim 1 wherein the negative electrode grid is composed of expanded stainless steel.

9. An electric storage battery according to claim 1 wherein said battery is hermetically sealed.

10. An electric storage battery according to claim 1 wherein the active battery structure is sealed in an epoxy resin and is maintenance free.

* * * * *